US 10,825,421 B2

(12) United States Patent
Luo et al.

(10) Patent No.: US 10,825,421 B2
(45) Date of Patent: Nov. 3, 2020

(54) ELECTRONIC DEVICE PHOTOGRAPHING METHOD, AND APPARATUS

(71) Applicant: Huawei Technologies Co., Ltd., Shenzhen (CN)

(72) Inventors: Honglei Luo, Shanghai (CN); Feng Gao, Shanghai (CN); Dede Jiang, Shanghai (CN); Jianjun Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/464,407

(22) PCT Filed: Nov. 29, 2016

(86) PCT No.: PCT/CN2016/107753
§ 371 (c)(1),
(2) Date: May 28, 2019

(87) PCT Pub. No.: WO2018/098638
PCT Pub. Date: Jun. 7, 2018

(65) Prior Publication Data
US 2019/0371270 A1    Dec. 5, 2019

(51) Int. Cl.
*G09G 5/10*      (2006.01)
*G09G 3/22*      (2006.01)

(52) U.S. Cl.
CPC ............... *G09G 5/10* (2013.01); *G09G 3/22* (2013.01); *G09G 2320/0233* (2013.01); *G09G 2320/0626* (2013.01); *G09G 2380/02* (2013.01)

(58) Field of Classification Search
CPC ... G09G 2320/0233; G09G 2320/0626; G09G 2380/02; G09G 3/22; G09G 5/10;
(Continued)

(56) References Cited

U.S. PATENT DOCUMENTS 9,740,381 B1 *   8/2017   Chaudhri ............... G06F 3/0488
2005/0200744 A1 *   9/2005   Kobayashi ........... H04N 5/2352
348/362
(Continued)

FOREIGN PATENT DOCUMENTS

CN         1726696 A      1/2006
CN       101191981 A      6/2008
(Continued)

OTHER PUBLICATIONS

Machine Translation and Abstract of Chinese Publication No. CN1726696, Jan. 25, 2006, 30 pages.
(Continued)

*Primary Examiner* — Tony O Davis
(74) *Attorney, Agent, or Firm* — Rimon PC

(57) ABSTRACT

An electronic device photographing method includes, after the electronic device enters a photographing screen, determining a folding angle of the flexible display screen based on a pixel coordinate parameter of a photographed object on the photographing screen; and/or determining target luminance of a display screen; and when detecting that a photographing button is pressed, adjusting luminance of the display screen to the determined target luminance. In this way, when the electronic device is used to take an image, fill-in light can be implemented for the photographed photo by improving target luminance of the display screen based on the pixel coordinate parameter of the photographed object on the photographing screen.

17 Claims, 9 Drawing Sheets

(58) Field of Classification Search
CPC ........... H04N 5/22525; H04N 5/23218; H04N 5/232939; H04N 5/2351; H04N 5/2354
USPC .......................................................... 345/156
See application file for complete search history.

(56) References Cited

U.S. PATENT DOCUMENTS

| | | | |
|---|---|---|---|
| 2012/0223968 | A1 | 9/2012 | Kashimoto |
| 2013/0215041 | A1 | 8/2013 | Kim et al. |
| 2014/0009449 | A1 | 1/2014 | Jang |
| 2015/0058723 | A1* | 2/2015 | Cieplinski ............ G06F 3/04847 715/702 |
| 2015/0222880 | A1* | 8/2015 | Choi ..................... H04N 13/302 348/43 |
| 2015/0229844 | A1 | 8/2015 | Yamazaki et al. |
| 2015/0301672 | A1 | 10/2015 | Kim et al. |
| 2019/0371270 | A1* | 12/2019 | Luo .................... H04N 5/23218 |

FOREIGN PATENT DOCUMENTS

| | | | |
|---|---|---|---|
| CN | 102652322 | A | 8/2012 |
| CN | 102929549 | A | 2/2013 |
| CN | 103645749 | A | 3/2014 |
| CN | 103902042 | A | 7/2014 |
| CN | 105047085 | A | 11/2015 |
| CN | 105554411 | A | 5/2016 |
| CN | 105915814 | A | 8/2016 |
| JP | 2002169198 | A | 6/2002 |

OTHER PUBLICATIONS

Machine Translation and Abstract of Chinese Publication No. CN101191981, Jun. 4, 2008, 9 pages.
Machine Translation and Abstract of Chinese Publication No. CN102929549, Feb. 13, 2013, 8 pages.
Machine Translation and Abstract of Chinese Publication No. CN105554411, May 4, 2016, 23 pages.
Machine Translation and Abstract of Chinese Publication No. CN105915814, Aug. 31, 2016, 13 pages.
Foreign Communication From a Counterpart Application, PCT Application No. PCT/CN2016/107753, English Translation of International Search Report dated Sep. 11, 2017, 2 pages.
Foreign Communication From a Counterpart Application, PCT Application No. PCT/CN2016/107753, English Translation of Written Opinion dated Sep. 11, 2017, 5 pages.
Machine Translation and Abstract of Chinese Publication No. CN103645749, Mar. 19, 2014, 16 pages.
Machine Translation and Abstract of Chinese Publication No. CN103902042, Jul. 2, 2014, 12 pages.
Foreign Communication From a Counterpart Application, Chinese Application No. 201680080607.2, Chinese Office Action dated Aug. 2, 2019, 11 pages.
Machine Translation and Abstract of Japanese Publication No. JP2002169198, Jun. 14, 2002, 25 pages.
Foreign Communication From a Counterpart Application, European Application No. 16922977.0, Extended European Search Report dated Oct. 8, 2019, 6 pages.

* cited by examiner

ELECTRONIC DEVICE PHOTOGRAPHING METHOD, AND APPARATUS

CROSS-REFERENCE TO RELATED APPLICATIONS

This application is a U.S. National Stage of International Application No. PCT/CN2016/107753 filed on Nov. 29, 2016, which is hereby incorporated by reference in its entirety.

TECHNICAL FIELD

The present invention relates to the field of electronic device technologies, and in particular, to an electronic device photographing method and an apparatus.

BACKGROUND

With rapid development of electronic technologies, an increasingly higher requirement is imposed on photographing technologies for an electronic device. Photographing performance depends on performance of a hardware device of a camera module and quality of light source control.

Currently, when a user performs photographing by using a camera module of an electronic device, there are two solutions for fill-in light. In a first solution for fill-in light, fill-in light is implemented by using a liquid crystal display of the electronic device, so as to improve a photographing effect. In this solution for fill-in light, luminance of the liquid crystal display is instantly increased by a plurality of times, light flashes at human eyes and the human eyes feel uncomfortable, user experience is poor, and therefore a display effect of an image obtained through photographing is poor. In a second solution for fill-in light, fill-in light is implemented by using a flashlight of the electronic device, so as to improve a photographing effect. Light of the flashlight is hard, an image shadow after the fill-in light is implemented is obvious, and therefore, a display effect of an image obtained through photographing is poor.

Therefore, when the user performs photographing by using the camera module of the electronic device, existing solutions for fill-in light can make the display effect of the image obtained through photographing poor.

SUMMARY

Embodiments of the present invention provide an electronic device photographing method and an apparatus, to improve a display effect of an image taken by a camera module of an electronic device and improve user experience.

According to a first aspect, an electronic device photographing method is provided, the electronic device includes a camera module, a main display screen, and at least one flexible display screen, and the method comprises: in response to the electronic device enters a photographing scenario, determining a folding angle of the at least one flexible display screen based on a pixel coordinate parameter of a photographed object on a photographing screen; determining target luminance of at least: the main display screen or the at least one flexible display screen; and in response to a determined target luminance and a detection that a photographing button of the electronic device is pressed, adjusting luminance of the at least one of: the main display screen or the at least one flexible display screen. In this way, when the electronic device is used to take an image, fill-in light can be implemented for the photographed object by improving the target luminance of the display screen based on the pixel coordinate parameter of the photographed object on the photographing screen, and fill-in light is specifically implemented for the photographed photo by determining the folding angle of the flexible display screen, so as to improve an image photographing effect and improve user experience.

With reference to the first aspect, in a possible design, the method further includes: in response to the electronic device enters a photographing scenario, detecting at least one of: luminance of an image of the photographed object that is generated on the photographing screen, or luminance of ambient light.

With reference to the first aspect, in a possible design, the method further includes: in response to a detection that the luminance of the image of the photographed object that is generated on the photographing screen is less than a first preset threshold, or a detection that the luminance of the ambient light is less than a second preset threshold, determining at least one of: the folding angle of the at least one flexible display screen based on the pixel coordinate parameter of the photographed object on the photographing screen, or the target luminance of the at least one of: the main display screen or the at least one flexible display screen. In this design, when the luminance of the image of the photographed object that is generated on the photographing screen is relatively low or the luminance of the ambient light is relatively low, an image photographing effect is poor. In this case, directional control of screen fill-in light can be implemented by controlling the folding angle of the flexible display screen, and intensity and softness of a fill-in light source can be controlled by controlling the target luminance of the display screen, so as to implement a more stereo and softer fill-in light effect, and improve the image photographing effect.

With reference to the first aspect, in a possible design, the pixel coordinate parameter of the photographed object on the photographing screen comprises at least one of: a pixel of the photographed object on the photographing screen, or a pixel coordinates of the photographed object on the photographing screen.

With reference to the first aspect, in a possible design, the determining the folding angle of the at least one flexible display screen based on the pixel coordinate parameter of the photographed object on the photographing screen comprises: determining the folding angle of the at least one flexible display screen based on an angle of view of the camera module and the pixel coordinate parameter of the photographed object on the photographing screen. In this design, the folding angle of the flexible display screen is determined based on the angle of view of the camera module and the pixel coordinate parameter of the photographed object on the photographing screen, so that directional control of screen fill-in light is more targeted and closer to actual requirements.

With reference to the first aspect, in a possible design, the determining the target luminance step comprises: based on luminance of the photographing screen, determining the target luminance of the at least one of: the main display screen or the at least one flexible display screen. In this design, the target luminance of the display screen is determined based on the luminance of the photographing screen. The determined target luminance can implement a better fill-in light effect, so that luminance of the image formed after photographing is performed is softer.

With reference to the first aspect, in a possible design, the flexible display screen performs displaying on one side or two sides.

According to a second aspect, a photographing apparatus is provided, the apparatus is applied to an electronic device that includes a camera module, a main display screen, and at least one flexible display screen, and the apparatus includes: a determining unit, configured to: in response to the electronic device enters a photographing scenario, determining a folding angle of the at least one flexible display screen based on a pixel coordinate parameter of a photographed object on a photographing screen, determine target luminance of at least: the main display screen or the at least one flexible display screen; and an adjustment unit, configured to: in response to a determined target luminance and a detection that a photographing button of the electronic device is pressed, adjust luminance of the at least: the main display screen or the at least one flexible display screen.

With reference to the second aspect, in a possible design, the apparatus further includes: a detection unit, configured to: in response to the electronic device enters a photographing scenario, detect at least one of: luminance of an image of the photographed object that is generated on the photographing screen, or luminance of ambient light.

Based on a same inventive concept, for a problem-resolving principle and beneficial effects of the apparatus, refer to the first aspect and the possible implementations of the first aspect and the brought beneficial effects. Therefore, for implementation of the apparatus, refer to the implementation of the method. Repeated parts are not described.

According to a third aspect, an electronic device is provided, and the electronic device includes: a camera module, a main display screen, and at least one flexible display screen; a memory, where the memory stores a program instruction; and at least one processor, configured to execute the program instruction to perform the following operations: in response to the electronic device enters a photographing scenario, determining a folding angle of the at least one flexible display screen based on a pixel coordinate parameter of a photographed object on a photographing screen; and in response to a determined target luminance and a detection that a photographing button of the electronic device is pressed, adjusting luminance of the at least one of: the main display screen or the at least one flexible display screen. The processor invokes the instruction stored in the memory, to implement the solution in the method designs of the first aspect. For a problem-resolving implementation and beneficial effects of the electronic device, refer to the first aspect and the possible method implementations of the first aspect and the brought beneficial effects. Therefore, for implementation of the electronic device, refer to the implementation of the method. Repeated parts are not described.

According to a fourth aspect, a computer storage medium is provided, the storage medium is a non-volatile computer readable storage medium, the non-volatile computer readable storage medium stores at least one program, each program includes a computer software instruction used in the solution in the method designs of the first aspect, and when the instruction is executed by an electronic device that includes a processor, a camera module, a main display screen, and at least one flexible display screen, the electronic device performs the method according to the first aspect and the method designs of the first aspect.

When compared with an image photographing solution in the prior art, in the image photographing solution provided in the present invention, fill-in light can be implemented for the photographed photo by improving the target luminance of the display screen based on the pixel coordinate parameter of the photographed object on the photographing screen, and fill-in light is specifically implemented for the photographed photo by determining the folding angle of the flexible display screen, so as to improve an image photographing effect and improve user experience.

DESCRIPTION OF EMBODIMENTS

Figure 1:
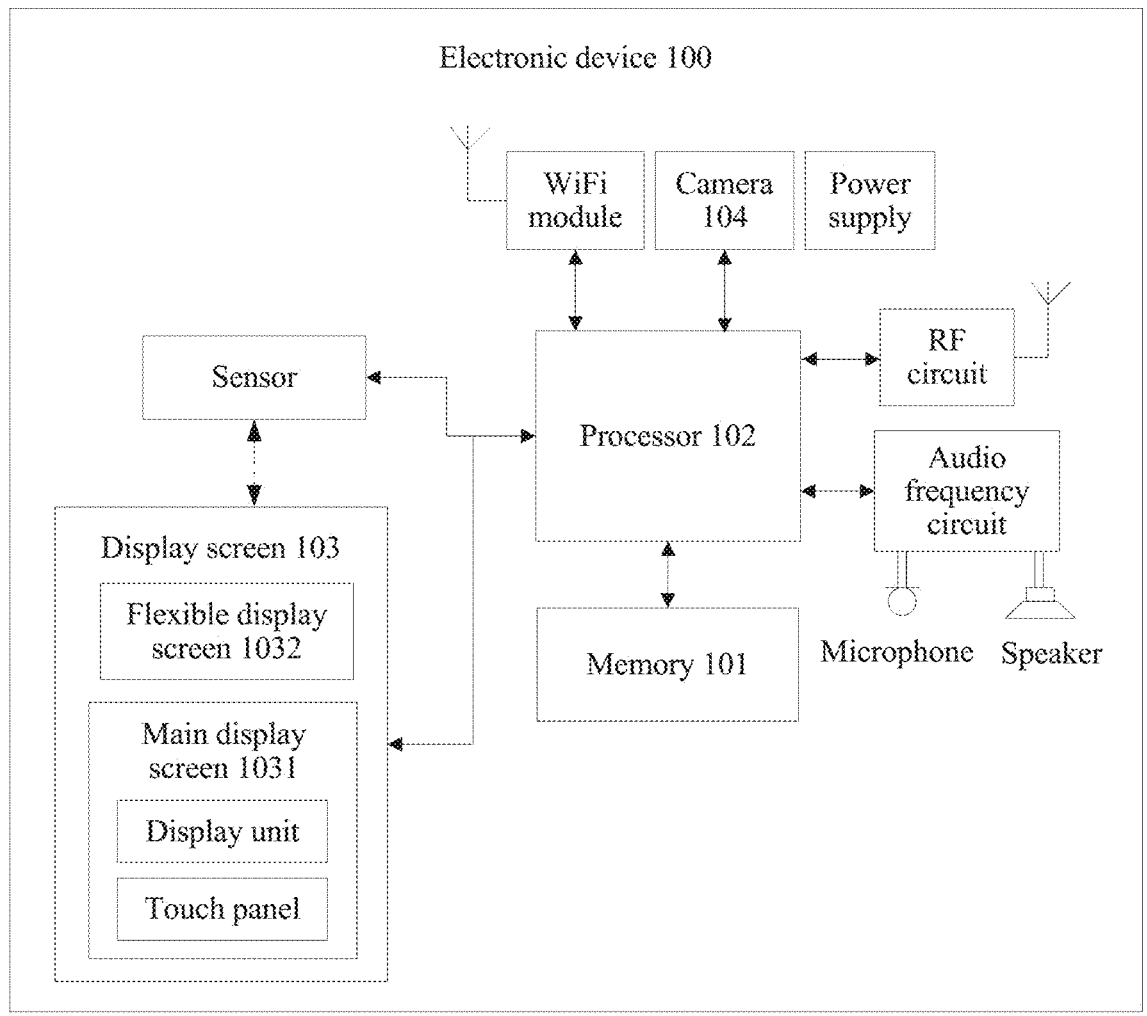
FIG. 1 is a schematic structural diagram of an electronic device according to an embodiment of the present invention.

The following describes the technical solutions in the embodiments of the present invention in detail with reference to the accompanying drawings in the embodiments of the present invention. Apparently, the described embodiments are some rather than all of the embodiments of the present invention. FIG. 1 shows an internal structure of an electronic device 100 according to an embodiment of the present invention. The electronic device 100 may include a mobile phone, a tablet computer, a personal digital assistant (Personal Digital Assistant, PDA), a point of sale (Point of Sale, POS), an in-vehicle computer, a desktop computer, a notebook computer, a server, and the like.

Figure 2A:
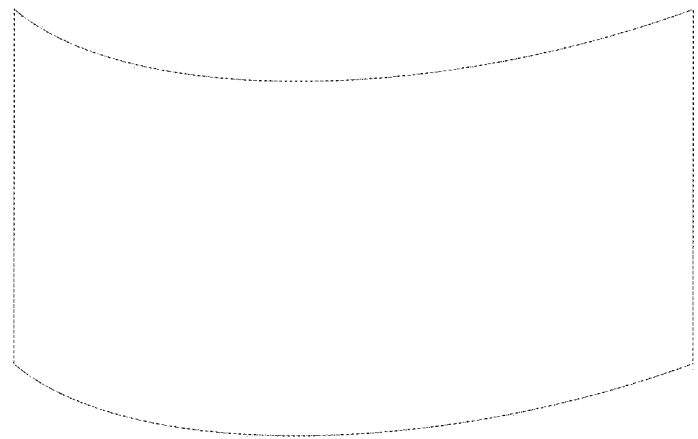
FIG. 2A, FIG. 2B, FIG. 2C, and FIG. 2D are schematic diagrams of a flexible display screen.
Figure 2B:
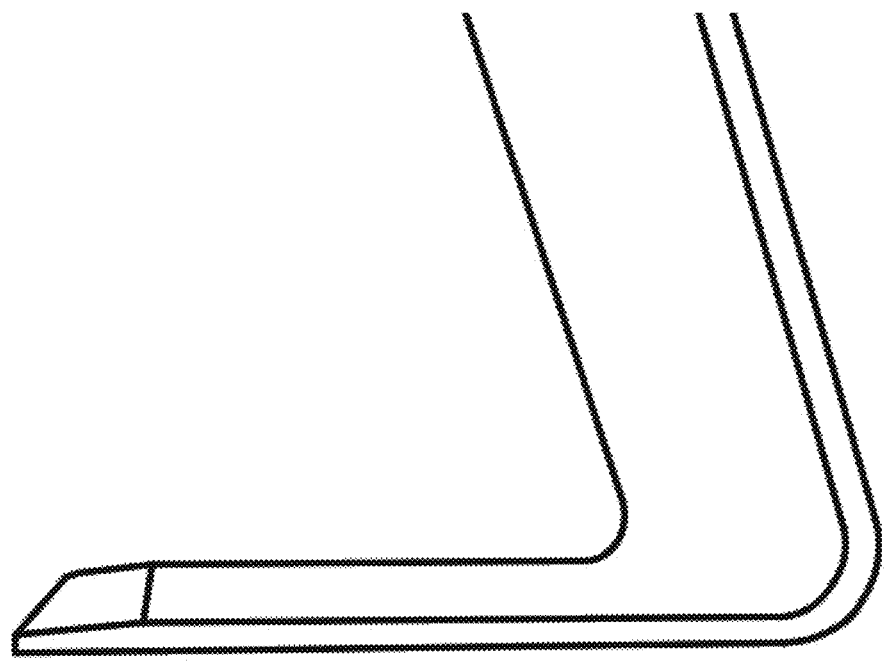
Figure 2C:
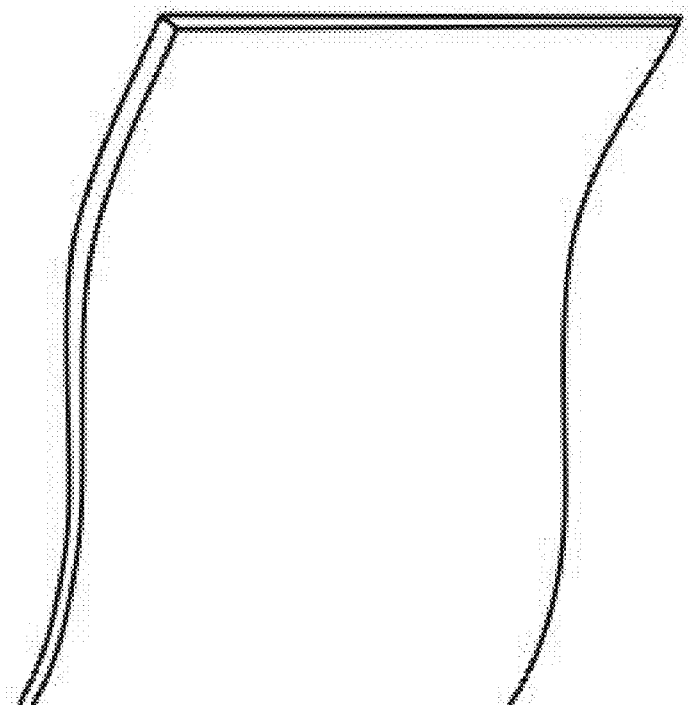
Figure 2D:
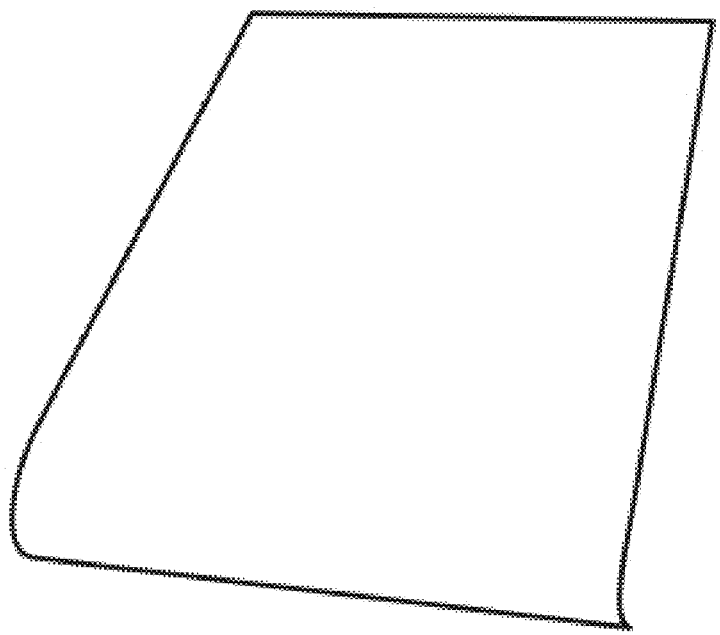

As shown in FIG. 1, the electronic device 100 may internally include a processor 102 and a memory 101, a display screen 103, and a camera module 104 that are connected to the processor 102. The display screen 103 includes a main display screen 1031 and at least one flexible display screen 1032. It should be noted that the flexible display screen 1032 may be a bendable, rollable, or foldable flexible display screen. The flexible display screen in this embodiment of the present invention is not limited to various types of display screens that can implement flexible display, for example, an organic light-emitting diode (Organic Light-Emitting Diode, OLED) display, an active-matrix organic light-emitting diode (Active-matrix organic light emitting diode, AMOLED) display, a micro-LED (Micro-LED), or a liquid crystal display (Liquid Crystal Display, LCD). The flexible display screen can be the AMOLED display screen. FIG. 2A is a schematic diagram of a bendable flexible display screen. FIG. 2B is a schematic diagram of a foldable flexible display screen. FIG. 2C and FIG. 2D are schematic diagrams of a rollable flexible display screen. It should be noted that the flexible display screen 1032 may perform displaying on one side or two sides. The electronic device may have a random quantity of flexible display screens, and the flexible display screens may be located on a left, right, upper, and/or lower side of the main display screen.

It should be noted that the flexible display screen in this embodiment of the present invention may be an active light-emitting flexible display screen, for example, an AMOLED flexible display screen, or may be a passive light-emitting display screen, for example, a liquid crystal display. The main display screen in this embodiment of the present invention may be an active light-emitting display screen, for example, an OLED display screen, or may be a passive light-emitting display screen, for example, a liquid crystal display.

Figure 3:
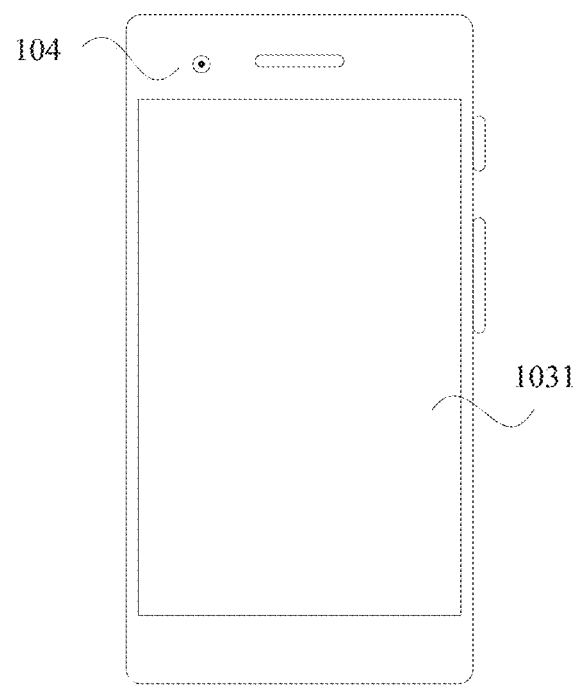
FIG. 3 is a schematic diagram of a folded flexible display screen of an electronic device according to an embodiment of the present invention.
Figure 4:
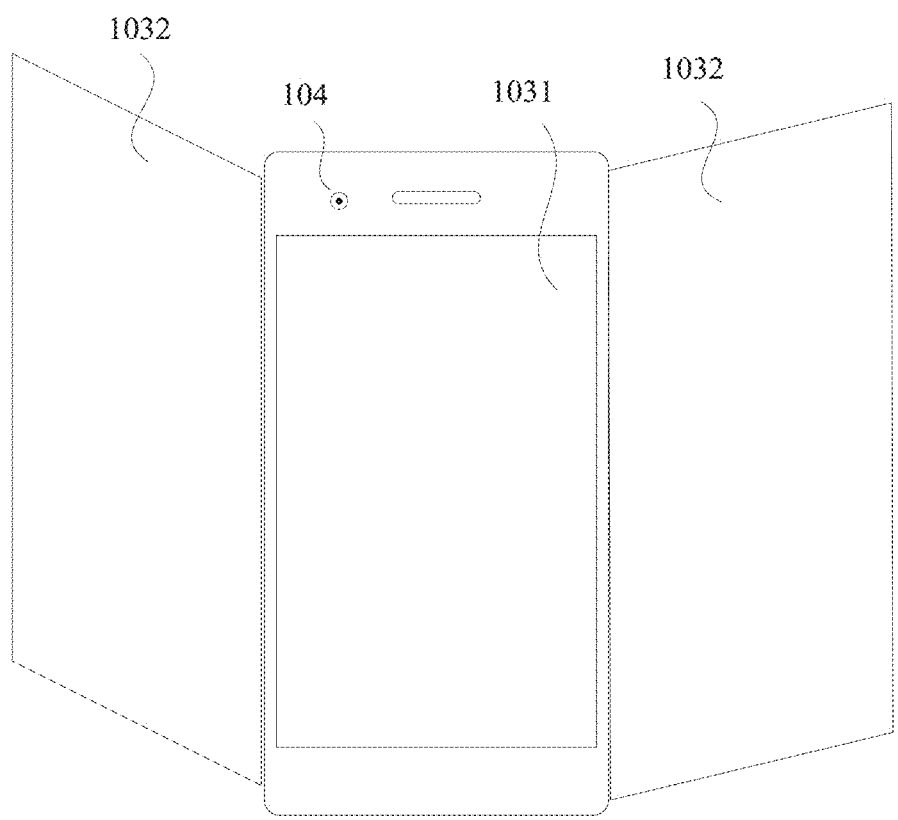
FIG. 4 is a schematic diagram of an expanded flexible display screen of an electronic device according to an embodiment of the present invention.

The flexible display screen may be folded or expanded. When the flexible display screen is folded, the flexible display screen may be located at a lower part of the main display screen or in another structure of the electronic device. FIG. 3 and FIG. 4 are respectively schematic diagrams of a folded flexible display screen and an expanded flexible display screen of an electronic device according to an embodiment of the present invention. The expanded flexible display screen in this embodiment of the present invention may be rolled, bent, or flat. In FIG. 4, a flat flexible display screen is used as an example to describe a form of the expanded flexible display screen. This constitutes no limitation on the form of the flexible display screen.

Optionally, the electronic device 100 may further include external devices such as a speaker and a microphone. When communicating with the outside in a wireless mode, the electronic device 100 may further include a radio frequency (Radio Frequency, RF) circuit and a connected antenna, a Wireless Fidelity (Wireless Fidelity, WiFi) module and a connected antenna, and the like. In addition, the electronic device 100 further includes a power supply supplying power to the electronic device 100.

It may be understood by persons skilled in the art that the internal structure of the electronic device shown in FIG. 1 does not constitute a limitation on the electronic device. The electronic device may include more or fewer components than those shown in the figure, or combine some components, or have different component arrangements.

The following describes each component of the electronic device 100 in detail with reference to FIG. 1.

The memory 101 may be configured to store a program and data. The processor 102 performs various functional applications of the electronic device 100 and data processing by running the program stored in the memory 101.

The memory 101 may mainly include a program storage area and a data storage area. The program storage area may store an operating system (for example, an Android operating system, "Android system" for short, or iOS operating system, "iOS system" for short, where the operating system may also be referred to as "system" for short), an application program required by at least one function (for example, an audio playing function or an image playing function), and the like. The data storage area may store data (for example, audio data or a phone book) that is created based on use of the electronic device 100, and the like.

In addition, the memory 101 may include a high-speed random access memory, or may include a nonvolatile memory, for example, at least one magnetic disk memory, a flash memory, or another volatile solid-state storage.

The processor 102 is a control center of the electronic device 100, connects various parts of the entire mobile phone by using various interfaces and lines, and performs various functions of the electronic device 100 and data processing by running or executing the program (or referred to as "module") stored in the memory 101 and invoking data stored in the memory 101, so as to perform overall monitoring on the electronic device 100.

Optionally, the processor 102 may include at least one processing unit. Optionally, the processor 102 may integrate an application processor and a modem processor. The application processor mainly processes an operating system, a user interface, an application program, and the like. The modem processor mainly processes wireless communication. It may be understood that the modem processor may not be integrated into the processor 102.

By running the operating system stored in the memory 101, the processor 102 invokes the application program to implement a function provided by the application program.

In this embodiment of the present invention, the operating system in the electronic device 100 invokes the program stored in the memory 101 to control the display screen 103 when photographing is performed. The display screen 103 specifically includes the main display screen 1031 and the flexible display screen 1032. Fill-in light is implemented for a photographed object by using the display screen, so as to complete an electronic device photographing procedure provided in the embodiments of the present invention.

The processor 102 runs the program stored in the memory 101 to perform the following operations: after the electronic device 100 enters a photographing screen, determining a folding angle of the flexible display screen 1032 based on a pixel coordinate parameter of a photographed object on the photographing screen, and folding the flexible display screen 1032 based on the determined folding angle; and/or determining target luminance of the display screen 103; and when detecting that a photographing button is pressed, adjusting luminance of the display screen 103 to the determined target luminance. The display screen 103 includes the main display screen 1031 and the flexible display screen 1032.

In this embodiment of the present invention, the main display screen 1031 may include a touch panel, a display unit, and the like.

The touch panel, also referred to as a touchscreen, may collect a touch operation of a user on or near the touch panel (for example, an operation performed by a user on the touch panel or near the touch panel by using any appropriate object or accessory such as a finger or a stylus), and drive a corresponding connection apparatus based on a preset program.

Optionally, the touch panel may include two parts: a touch detection apparatus and a touch controller.

In addition, the touch panel may be implemented in a plurality of types, for example, a resistive type, a capacitive type, infrared, or a surface acoustic wave.

The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 102, and the touch controller can receive and execute a command sent by the processor 102.

The display unit may be configured to display information input by the user or information provided for the user and various menus of the electronic device 100. Optionally, the display unit may be configured in a form of a liquid crystal display (Liquid Crystal Display, LCD), an active-matrix organic light-emitting diode (Active Matrix Organic Light-Emitting Diode, AMOLED), or the like.

As shown in FIG. 1, the touch panel and the display unit may be integrated to form the main display screen 1031, which is configured to implement an input function and an output function of the electronic device 100. Alternatively, the touch panel and the display unit may be used as two separate components, to respectively implement the input function and the output function of the electronic device 100. Further, the touch panel may cover the display unit. When detecting the touch operation on or near the touch panel, the touch panel transmits the touch operation to the processor 102 to determine a type of the touch event. Then, the processor 102 provides corresponding visual output on the display unit based on the type of the touch event. This is not limited in this embodiment of the present invention.

The RF circuit may be configured to: receive and transmit information or receive and transmit signals in a call process, and in particular, after receiving downlink information from a base station, transmit the downlink information to the processor 102 for processing, and transmit uplink data to the base station.

The RF circuit usually includes but is not limited to an antenna, at least one amplifier, a transceiver, a coupler, a low noise amplifier (Low Noise Amplifier, LNA), a duplexer, and the like.

In addition, the RF circuit may communicate with a network and another device through wireless communication.

Any communications standard or protocol may be used for the wireless communication, including but not limited to: a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution. LTE), an email, a short message service (Short Message Service. SMS), and the like.

In FIG. 1, an audio frequency circuit, the speaker, and the microphone may provide an audio interface between a user and the electronic device 100.

The audio frequency circuit may transmit, to the speaker, an electrical signal converted from received audio data, and the speaker converts the electrical signal into an audio signal for outputting. In addition, the microphone converts a captured audio signal into an electrical signal, and the audio frequency circuit converts the received electrical signal into audio data, and then outputs the audio data to the RF circuit. Then, the audio data is transmitted to another electronic device, for example, a mobile phone, or the audio data is output to the memory 101 for further processing.

WiFi is a short-range wireless transmission technology. By using the WiFi module, the electronic device 100 may help a user receive and transmit e-mails, browse web pages, access streaming media, and the like. It provides wireless broadband Internet access for the user.

Although FIG. 1 shows the WiFi module, it may be understood that the WiFi module is not a necessary component of the electronic device 100 and may be omitted based on a requirement without changing the essence of the embodiments of the present invention.

The electronic device 100 further includes a power supply (for example, a battery) supplying power to each component. Optionally, the power supply may be logically connected to the processor 102 by using a power management system, so as to implement functions such as charge and discharge management and power consumption management by using the power management system.

The electronic device 100 may further include a sensor (for example, a light sensor or a motion sensor).

Specifically, the light sensor may include an ambient light sensor and a proximity sensor.

The ambient light sensor may adjust luminance of the display unit based on brightness of ambient light. The proximity sensor may turn off the display unit and/or a backlight when the electronic device 100 moves to an ear.

As a motion sensor, an accelerometer sensor may detect acceleration magnitudes in all directions (generally three axes). When being stationary, the accelerometer sensor may detect a magnitude and a direction of gravity, and may be configured to recognize a posture application of the mobile phone (for example, switching between landscape and portrait, related games, and magnetometer posture calibration), vibration recognition related functions (for example, a pedometer and a stroke), and the like.

As regards other sensors that can be configured for the electronic device 100, for example, a gyroscope, a barometer, a hygrometer, a thermometer, and an infrared sensor, details are not described herein.

In addition, the electronic device 100 may further include an NFC module, a Bluetooth module, and the like. Details are not described herein.

The following describes the method provided in the embodiments of the present invention.

An embodiment of the present invention provides an electronic device photographing method. The method may be performed by the electronic device 100 described above. This embodiment of the present invention relates to various technologies for image photographing by using the electronic device. The electronic device includes functions for implementing image photographing, including: after the electronic device enters a photographing screen, determining a folding angle of a flexible display screen based on a pixel coordinate parameter of a photographed object on the photographing screen; and/or determining target luminance of a display screen; and when detecting that a photographing button is pressed, adjusting luminance of the display screen to the determined target luminance.

The following describes, by using a specific scenario, an electronic device photographing process in which a user implements image photographing by using the electronic device.

Scenario 1:

1. The user taps an application icon of a camera module on a mobile phone, and after the mobile phone enters a photographing screen, a front-facing camera module is started to enter a photographing screen of a selfie mode.

2. The mobile phone determines a folding angle of a flexible display screen based on a pixel coordinate parameter of a photographed object on the photographing screen, and determines target luminance of a display screen.

3. When detecting that a photographing button is pressed, the mobile phone adjusts luminance of the display screen to the determined target luminance.

An operation of determining the target luminance of the display screen by the mobile phone is optional.

Scenario 2:

1. The user taps an application icon of a camera module on a mobile phone, and after the mobile phone enters a photographing screen, a rear-facing camera module is started to enter a photographing screen of a normal photographing mode.

2. The mobile phone determines a folding angle of a flexible display screen based on a pixel coordinate parameter of a photographed object on the photographing screen, and determines target luminance of a display screen.

3. When detecting that a photographing button is pressed, the mobile phone adjusts luminance of the display screen to the determined target luminance.

An operation of determining the target luminance of the display screen by the mobile phone is optional.

It should be noted that the display screen in the scenario 1 and the scenario 2 includes a main display screen and the flexible display screen. The flexible display screen performs displaying on one side or two sides. When the flexible display screen performs displaying on one side, the folded display screen in the scenario 1 performs displaying on the front, and the folded display screen in the scenario 2 performs displaying on the back.

Figure 5:
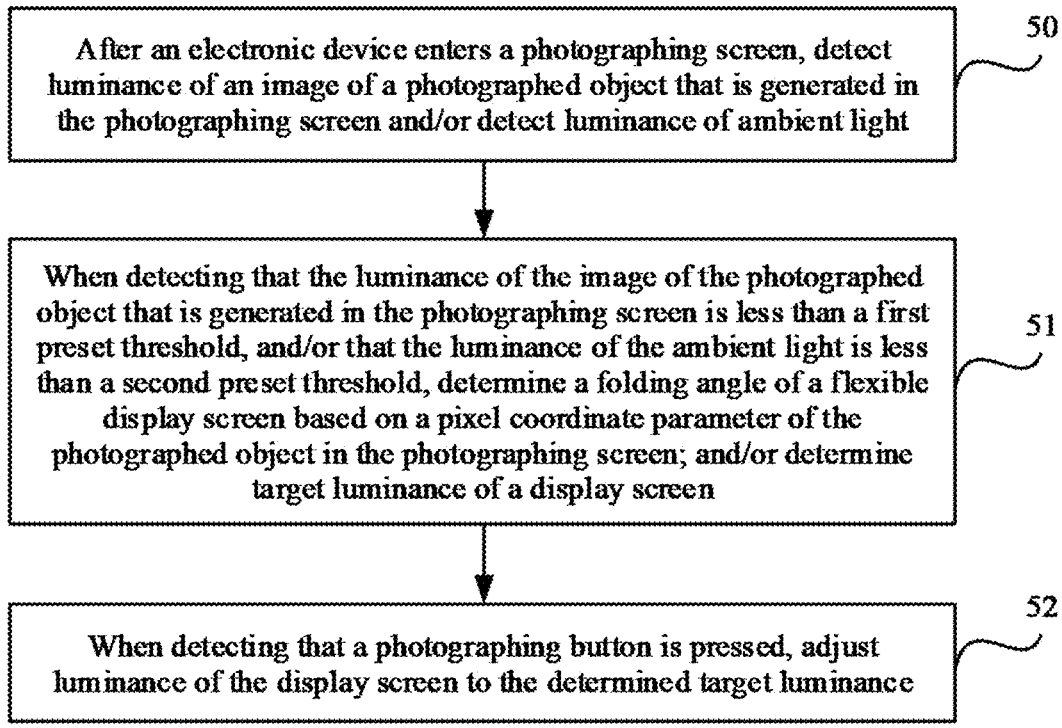
FIG. 5 is a flowchart of an image photographing method according to an embodiment of the present invention.

FIG. 5 is a flowchart for implementing an image photographing method corresponding to a possible implementation provided in the scenario 1 and the scenario 2. The procedure specifically includes the following steps:

Step 50: After the electronic device enters a photographing screen, detect luminance of an image of a photographed object that is generated on the photographing screen and/or detect luminance of ambient light.

Step 51: When detecting that the luminance of the image of the photographed object that is generated on the photographing screen is less than a first preset threshold, and/or that the luminance of the ambient light is less than a second preset threshold, determine a folding angle of a flexible display screen based on a pixel coordinate parameter of the photographed object on the photographing screen; and/or determine target luminance of a display screen.

The pixel coordinate parameter of the photographed object on the photographing screen includes a pixel and/or pixel coordinates of the photographed object on the photographing screen.

Specifically, the determining a folding angle of a flexible display screen based on a pixel coordinate parameter of the photographed object on the photographing screen includes:

determining the folding angle of the flexible display screen based on an angle of view of a camera module and the pixel coordinate parameter of the photographed object on the photographing screen.

Further, the determining the folding angle of the flexible display screen based on an angle of view of a camera module and the pixel coordinate parameter of the photographed object on the photographing screen may include the following two cases:

In a first case, the flexible display screen is located on a left side of a main display screen of a terminal, and a horizontal pixel value p1 of a lower left boundary point of an image of the photographed object that is formed on the main display screen is obtained. A folding angle $\alpha1$ corresponding to the flexible display screen on the left side is determined based on a quantity X of pixels of the camera module of the terminal in a horizontal direction, the angle $\beta$ of view of the camera module, and the p1 by using the following formula:

$$\alpha1=90°+(0.5\times X-p1)\div(0.5\times X)\times 0.5\times \beta$$

In a second case, the flexible display screen is located on a right side of the main display screen of the terminal, and a horizontal pixel value p2 of an upper right boundary point of the image of the photographed object that is formed on the main display screen is obtained. A folding angle $\alpha2$ corresponding to the flexible display screen on the right side is determined based on a quantity X of pixels of the camera module of the terminal in a horizontal direction, the angle $\beta$ of view of the camera module, and the a2 by using the following formula:

$$\alpha2=90°+(p1-0.5\times X)\div(0.5\times X)\times 0.5\times \beta$$

It should be noted that the foregoing formulas are merely example implementations. In actual application, the folding angle corresponding to the flexible display screen may be determined in another possible implementation. This is not specifically limited herein.

The folding angle of the flexible display screen is a supplementary angle of an included angle between two planes: the flexible display screen and the main display screen. When a front-facing camera module is started, the flexible display screen is folded from a plane consistent with the main display screen towards a front of the terminal, and folding does not end until reaching the determined folding angle. In this case, the display screen performs displaying on one side on the front or performs displaying on two sides. Likewise, when a rear-facing camera module is started, the flexible display screen is folded from a plane consistent with the main display screen towards a back of the terminal, and folding does not end until reaching the determined folding angle. In this case, the display screen performs displaying on one side on the back or performs displaying on two sides. A front of the display screen is consistent with the front of the terminal, and a back of the display screen is consistent with the back of the terminal.

Figure 6A:
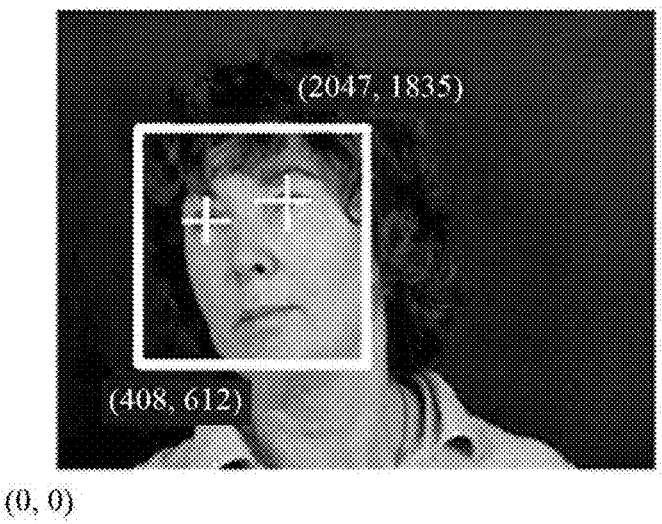
FIG. 6A is a schematic diagram of a formed image of a photographed photo in a photographing screen.
Figure 6B:
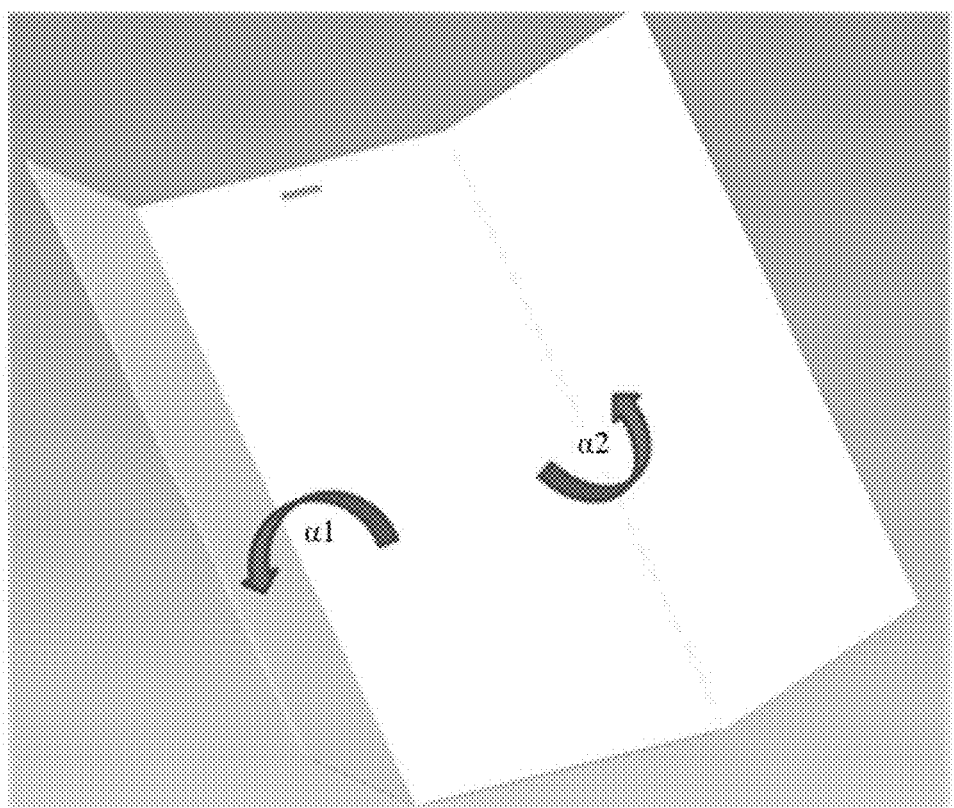
FIG. 6B is a schematic diagram of folding angles of two flexible display screens.

An example in which the terminal has two flexible display screens is used to describe a process of determining folding angles of the flexible display screens. FIG. 6A is a schematic diagram of a formed image of a photographed photo in a photographing screen. FIG. 6B is a schematic diagram of folding angles of two flexible display screens.

Figure 7:
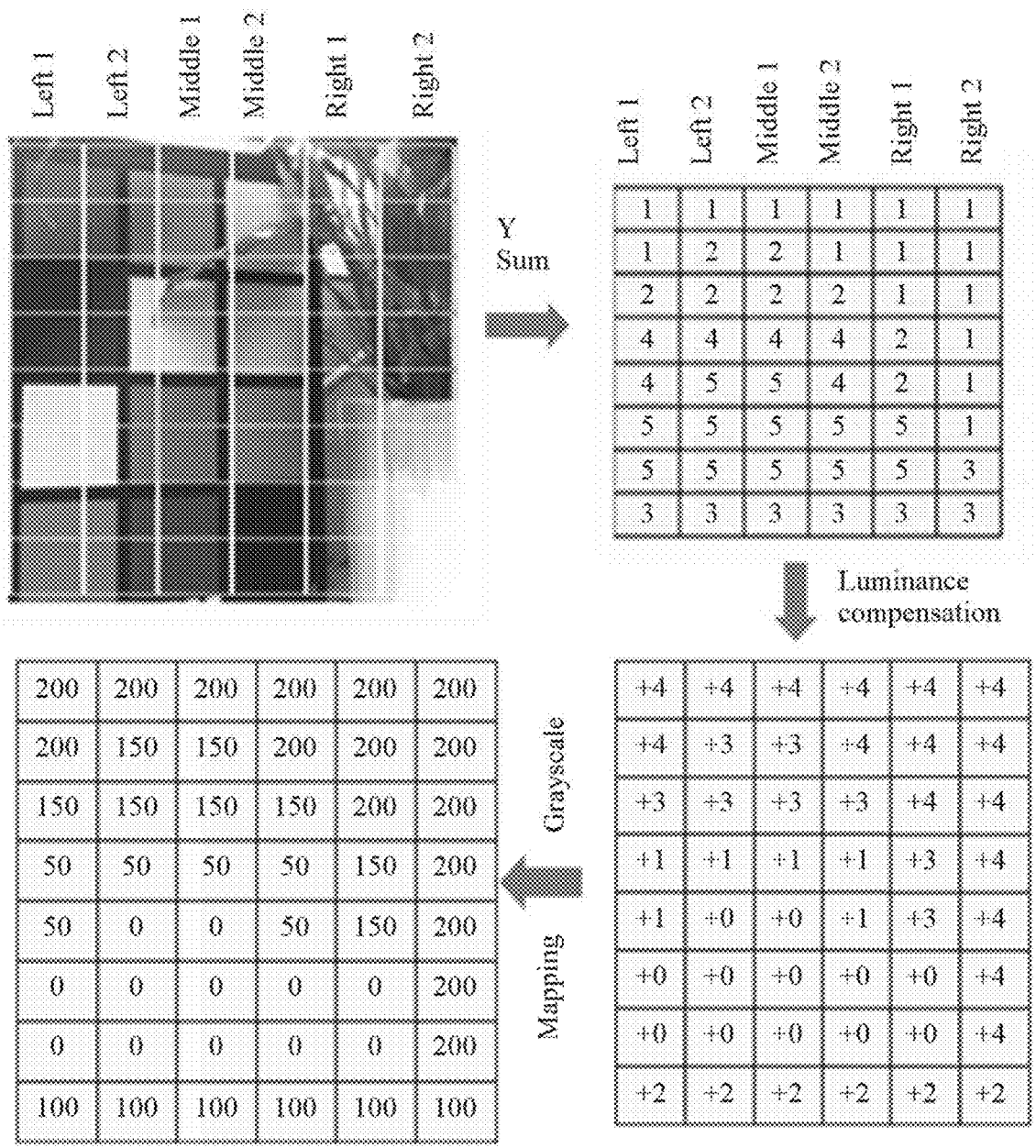
FIG. 7 is a schematic diagram of determining human face pixel coordinates by using a facial recognition function according to an embodiment of the present invention.

In FIG. 7 of the embodiments of the present invention, an example in which human face pixel coordinates are determined by using a facial recognition function is used to describe a process of determining a folding angle of a flexible display screen. However, this embodiment of present invention is not limited to a human face, but also applicable to pixel coordinates of a characteristic of a photographed object or another photographed object in a photographing screen.

An example in which the camera module of the terminal has eight million pixels and the angle of view is 94° is used. A quantity of pixels of a chip is 3264*2448, and the pixel and/or pixel coordinates of the photographed object are/is obtained by using a scene recognition function. Coordinates of a lower left pixel and coordinates of an upper right pixel of a photographed human face are respectively determined as (408, 612) and (2047, 1835) by using the facial recognition function of image signal processing (Image Signal Processing, ISP) metering module, and therefore, a quantity of pixels of a facial contour is 1639×1223.

An example in which a direction of the camera module is the same as a direction of the photographed object is used, a folding angle $\alpha1$ of a flexible display screen on a left side and a folding angle $\alpha2$ of a flexible display screen on a right side are calculated.

$$\alpha1=90°+(0.5\times 3264-408)\div(0.5\times 3264)\times 0.5\times 94°=125°,$$
to be specific, the folding angle $\alpha1$ of the flexible display screen on the left side is 125°.

$$\alpha2=90°+(2047-0.5\times 3264)\div(0.5\times 3264)\times 0.5\times 94°=102°,$$ to be specific, the folding angle $\alpha2$ of the flexible display screen on the right side is 102°.

Specifically, the determining target luminance of a display screen includes: determining the target luminance of the display screen based on luminance of the photographing screen. In this case, the display screen includes the main display screen and the flexible display screen.

Specifically, when the flexible display screen is an active light-emitting flexible display screen, for example, an OLED flexible display screen, the target luminance of the display screen can be adjusted by adjusting an anode power supply and a cathode power supply of the OLED or adjusting grayscale data. When the flexible display screen is a passive light-emitting display screen, for example, a liquid crystal display, the target luminance of the display screen can be adjusted by adjusting luminance of a backlight and/or adjusting a display grayscale.

Specifically, the determining the target luminance of the display screen based on luminance of the photographing screen may be implemented by using the following process:

S1: Divide the main display screen of the terminal into m*n child windows with m rows and n columns.

S2: Determine a mapping relationship between each column of child windows of the main display screen and the display screen. In this case, the display screen includes the main display screen and the flexible display screen, the main display screen may be an active light-emitting display screen (for example, an OLED display screen) or a passive light-emitting display screen (for example, a liquid crystal display), and the flexible display screen may be an active light-emitting flexible display screen (for example, an OLED flexible display screen) or a passive light-emitting flexible display screen (for example, a liquid crystal display).

S3: Determine, as luminance of fill-in light of each child window, a difference between display luminance of each child window after the image of the photographed object is formed on the main display screen and a third preset threshold.

S4: Determine, based on the mapping relationship between each column of child windows and the display screen and based on the determined luminance of fill-in light of each child window, the target luminance of the display screen to which each column of child windows are mapped.

The example in which the terminal has two flexible display screens is still used to describe the process of determining the target luminance of the display screen.

The camera module of the terminal obtains, by using an ISP metering module, luminance information of the image of the photographed photo that is formed on the main display screen, a picture of pre-photographing is divided into several child windows, and the picture is divided into 8*6=48 child windows herein. A mapping relationship between six columns of child windows and the display screen is as follows: fill-in light is implemented for two columns of child windows on a left side by using the left flexible display screen, fill-in light is implemented for two columns of child windows on a right side by using the right flexible display screen, and fill-in light is implemented for two columns of child windows in the middle by using the main display screen. For corresponding luminance of fill-in light of the 8*6 child windows, instantaneous target luminance of the display screen when photographing is performed may be determined by a picture grayscale of the picture of pre-photographing. For example, in this embodiment of the present invention, a grayscale white picture is set to 0 to 255, and a preset picture grayscale is set to 255, which corresponds to 5 levels. FIG. 7 shows a diagram of a process of determining a mapping relationship between luminance of fill-in light of an image of each child window and a picture displayed on the screen. Specifically, when determining the luminance of the fill-in light of each child window, a picture grayscale of each child window needs to be determined. In this case, the picture grayscale of each child window may be obtained by averaging grayscales of all pixels included in each child window.

Optionally, when determining the target luminance of the display screen, the target luminance of the display screen may be set to preset target luminance. In this case, each child window of the display screen has same luminance. Alternatively, the picture is not divided into child windows, and the entire display screen has same luminance, for example, in an all-white mode or with maximum luminance.

Optionally, in step 51, when adjusting the target luminance of the display screen, a display color of the display screen may be further adjusted.

Step 52: When detecting that a photographing button is pressed, adjust luminance of the display screen to the determined target luminance.

In step 52, optionally, when adjusting the luminance of the display screen, a color temperature of the display screen may be further adjusted.

Further, when detecting that the photographing button is pressed, the luminance of the display screen is adjusted to the determined target luminance and remains unchanged until a photographing file is generated, and then the luminance of the display screen is restored to the luminance before adjustment.

In this way, when the electronic device is used to take an image, fill-in light can be implemented for the photographed photo by improving the target luminance of the display screen based on the pixel coordinate parameter of the photographed object on the photographing screen, and fill-in light is specifically implemented for the photographed photo by determining the folding angle of the flexible display screen, so as to improve an image photographing effect and improve user experience.

Based on the foregoing embodiment, an embodiment of the present invention further provides an electronic device, for example, the electronic device shown in FIG. 1, FIG. 3, and FIG. 4. The electronic device includes a camera module, a main display screen, at least one flexible display screen, a memory, and at least one processor. The components are connected by using a bus.

The memory is configured to store computer executable program code, and the program code includes an instruction. When the processor executes the instruction, the instruction enables the electronic device to perform the photographing method in the method embodiments of the present invention, for example, the method described in steps 50, 51, and 52 in FIG. 5 of the method embodiment of the present invention. For a problem-resolving implementation and beneficial effects of the electronic device, refer to the foregoing implementations and the brought beneficial effects of the method. Therefore, for implementation of the electronic device, refer to the implementation of the method. Repeated parts are not described.

Figure 8:
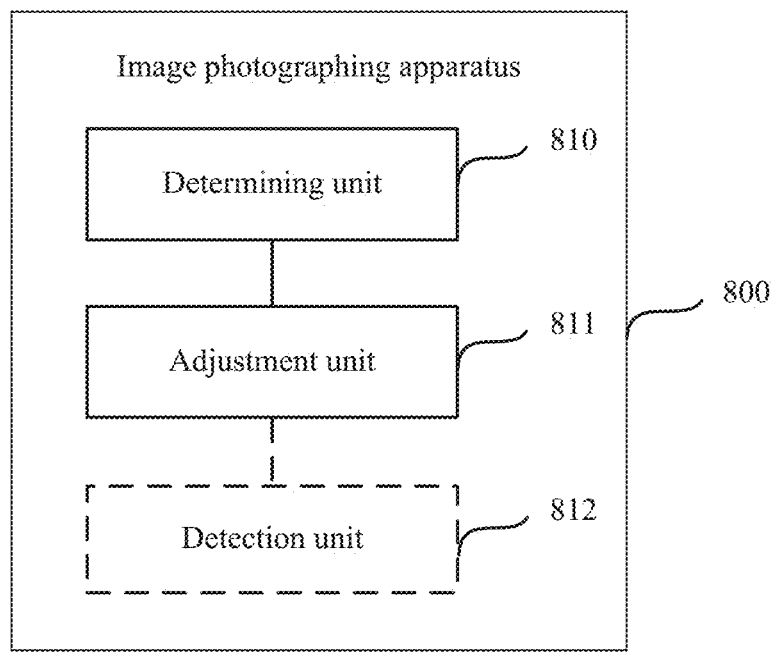
FIG. 8 is a schematic structural diagram of an image photographing apparatus according to an embodiment of the present invention.

Based on the foregoing embodiments, FIG. 8 shows a schematic structural diagram of an image photographing apparatus according to an embodiment of the present invention. The image photographing apparatus 800 is applied to an electronic device that includes a camera module, a main display screen, and at least one flexible display screen, and may be configured to perform an execution process of the electronic device in the method shown in FIG. 1 to FIG. 7.

The image photographing apparatus 800 includes a determining unit 810 and an adjustment unit 811.

The determining unit 810 is configured to perform the method of step 50 in FIG. 5 of the method embodiment of the present invention, for example, configured to: after the electronic device enters a photographing screen, determine a folding angle of the flexible display screen based on a pixel coordinate parameter of a photographed object on the photographing screen; and/or determine target luminance of a display screen.

For an implementation of the determining unit 810, refer to the description corresponding to step 50 in FIG. 5 of the method embodiment of the present invention. Details are not described herein.

The adjustment unit 811 is configured to perform the method of step 52 in FIG. 5 of the method embodiment of the present invention, for example, configured to: when detecting that a photographing button is pressed, adjust luminance of the display screen to the determined target luminance. For an implementation of the adjustment unit 811, refer to the description corresponding to step 52 in FIG. 5 of the method embodiment of the present invention. Details are not described herein.

Optionally, the image photographing apparatus 800 further includes:

a detection unit 812, configured to: after the electronic device enters the photographing screen, detect luminance of an image of the photographed object that is generated on the photographing screen and/or detect luminance of ambient light.

Optionally, the determining unit 810 is further configured to perform the method of step 51 in FIG. 5 of the method embodiment of the present invention, for example, configured to:

when the detection unit detects that the luminance of the image of the photographed object that is generated on the photographing screen is less than a first preset threshold, and/or that the luminance of the ambient light is less than a second preset threshold, determine the folding angle of the flexible display screen based on the pixel coordinate parameter of the photographed object on the photographing screen; and/or determine the target luminance of the display screen.

For an implementation of the determining unit 810, refer to the description corresponding to step 51 in FIG. 5 of the method embodiment of the present invention. Details are not described herein.

Optionally, the pixel coordinate parameter of the photographed object on the photographing screen includes a pixel and/or pixel coordinates of the photographed object on the photographing screen.

Optionally, the determining unit 810 is specifically configured to:

determine the folding angle of the flexible display screen based on an angle of view of the camera module and the pixel coordinate parameter of the photographed object on the photographing screen.

Optionally, the determining unit 810 is specifically configured to determine the target luminance of the display screen based on luminance of the photographing screen.

Optionally, the flexible display screen performs displaying on one side or two sides.

The image photographing apparatus 800 in this embodiment of the present invention may be an independent component, or may be integrated into another component. For example, the image photographing apparatus 800 provided in this embodiment of the present invention may be a terminal in an existing communications network, or may be a component integrated into the terminal.

It should be noted that, for a function implementation and an interaction manner of each unit in the image photographing apparatus 800 in this embodiment of the present invention, further refer to descriptions in the related method embodiment. Details are not described herein.

The foregoing "unit" may be implemented by using an application-specific integrated circuit (application-specific integrated circuit, ASIC), a processor and a memory that execute one or more software or firmware programs, an integrated logic circuit, and/or another component that can provide the foregoing functions.

For a problem-resolving implementation and beneficial effects of the image photographing apparatus 800, refer to the implementations and the brought beneficial effects of the method embodiment of the present invention. Therefore, for implementation of the image photographing apparatus, refer to the implementation of the method. Repeated parts are not described.

Persons of ordinary skill in the art may understand that all or some of the steps of the method embodiment may be implemented by a program instructing a processor. The program may be stored in a computer readable storage medium. The storage medium may be a non-transitory (non-transitory) medium, such as a random access memory, a read-only memory, a flash memory, a hard disk, a solid-state drive, a magnetic tape (magnetic tape), a floppy disk (floppy disk), an optical disc (optical disc), or any combination thereof.

The present invention is described with reference to the flowchart and block diagram of the method and device according to the embodiments of the present invention. It should be understood that computer program instructions may be used to implement each process and each block in the flowchart and the block diagram and a combination of a process and a block in the flowchart and the block diagram. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more processes in the flowcharts or in one or more blocks in the block diagrams.

The foregoing descriptions are merely example implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An electronic device photographing method comprising:

entering a photographing scenario by an electronic device, wherein the electronic device comprises a camera, a main display screen, and at least one flexible display screen;

detecting, in response to the electronic device entering the photographing scenario, at least one of luminance of an image of the photographed object that is generated on a photographing screen or luminance of ambient light;

folding, in response to the electronic device entering the photographing scenario, the at least one flexible display screen, wherein a folding angle of the at least one flexible display screen corresponds to a pixel coordinate parameter of a photographed object on the photographing screen, wherein the folding angle of the at least one flexible display screen is determined based on the pixel coordinate parameter of the photographed object on the photographing screen either in response to a detection that the luminance of the image of the photographed object that is generated on the photographing screen is less than a first preset threshold or in response to a detection that the luminance of the ambient light is less than a second preset threshold; and adjusting, in response to detection that a photographing button of the electronic device is pressed, luminance of the at least one of the main display screen or the at least one flexible display screen.

2. The electronic device photographing method of claim 1, further comprising: determining a target luminance of the at least one of the main display screen or the at least one flexible display screen in response to a detection that the luminance of the image of the photographed object that is generated on the photographing screen is less than a first preset threshold; or determining the target luminance of the at least one of the main display screen or the at least one flexible display screen in response to a detection that the luminance of the ambient light is less than a second preset threshold.

3. The electronic device photographing method of claim 1, wherein the pixel coordinate parameter of the photographed object on the photographing screen comprises at least one of a pixel of the photographed object on the photographing screen or pixel coordinates of the photographed object on the photographing screen.

4. The electronic device photographing method of claim 1, wherein the method further comprises determining the folding angle of the at least one flexible display screen based on an angle of view of the camera and the pixel coordinate parameter of the photographed object on the photographing screen.

5. The electronic device photographing method of claim 1, wherein the method further comprises determining the luminance of the at least one of the main display screen or the at least one flexible display screen based on luminance of the photographing screen.

6. The electronic device photographing method of claim 1, wherein the flexible display screen performs displaying on either one side or two sides.

7. An electronic device, comprising:
at least one processor;
a camera coupled to the at least one processor;
a main display screen coupled to the at least one processor;
at least one flexible display screen coupled to the at least one processor; and
a memory coupled to the at least one processor, wherein the memory stores a program instruction, and wherein the at least one processor is configured to execute the program instruction to:
enter a photographing scenario by the electronic device;
detect, in response to the electronic device entering the photographing scenario, at least one of luminance of an image of the photographed object that is generated on a photographing screen or luminance of ambient light;
fold, in response to the electronic device entering the photographing scenario, the at least one flexible display screen, wherein a folding angle of the at least one flexible display screen is corresponding to a pixel coordinate parameter of a photographed object on a photographing screen, wherein the folding angle of the at least one flexible display screen is determined based on the pixel coordinate parameter of the photographed object on the photographing screen either in response to a detection that the luminance of the image of the photographed object that is generated on the photographing screen is less than a first preset threshold or in response to a detection that the luminance of the ambient light is less than a second preset threshold; and
adjust, in response to a detection that a photographing button of the electronic device is pressed, luminance of the at least one of the main display screen or the at least one flexible display screen.

8. The electronic device of claim 7, wherein the at least one processor is further configured to execute the program instruction to: determine a target luminance of the at least one of the main display screen or the at least one flexible display screen in response to a detection that the luminance of the image of the photographed object that is generated on the photographing screen is less than a first preset threshold; or determine the target luminance of the at least one of the main display screen or the at least one flexible display screen in response to a detection that the luminance of the ambient light is less than a second preset threshold.

9. The electronic device of claim 7, wherein the pixel coordinate parameter of the photographed object on the photographing screen comprises at least one of a pixel of the photographed object on the photographing screen or pixel coordinates of the photographed object on the photographing screen.

10. The electronic device of claim 7, wherein the at least one processor is further configured to execute the program instruction to determine the folding angle of the at least one flexible display screen based on an angle of view of the camera and the pixel coordinate parameter of the photographed object on the photographing screen.

11. The electronic device of claim 7, wherein the at least one processor is further configured to execute the program instruction to determine the luminance of the at least one of the main display screen or the at least one flexible display screen based on luminance of the photographing screen.

12. The electronic device of claim 7, wherein the at least one flexible display screen performs displaying on either one side or two sides.

13. A non-transitory computer readable medium for storing at least one program, wherein the at least one program comprises an instruction, and when the instruction is executed by an electronic device that comprises a processor, a camera, a main display screen, and at least one flexible display screen, the instruction enables the electronic device to:
enter a photographing scenario by the electronic device;
detect, in response to the electronic device entering the photographing scenario, at least one of luminance of an image of the photographed object that is generated on a photographing screen or luminance of ambient light;

fold, in response to the electronic device entering the photographing scenario, the at least one flexible display screen, wherein a folding angle of the at least one flexible display screen is corresponding to a pixel coordinate parameter of a photographed object on a photographing screen, wherein the folding angle of the at least one flexible display screen is determined based on the pixel coordinate parameter of the photographed object on the photographing screen either in response to a detection that the luminance of the image of the photographed object that is generated on the photographing screen is less than a first preset threshold or in response to a detection that the luminance of the ambient light is less than a second preset threshold;

determine and adjust, in response to a detection that a photographing button of the electronic device is pressed, luminance of the at least one of the main display screen or the at least one flexible display screen.

14. The non-transitory computer readable medium of claim 13, wherein the instruction further enables the electronic device to either:

determine a target luminance of the at least one of the main display screen or the at least one flexible display screen in response to a detection that the luminance of the image of the photographed object that is generated on the photographing screen is less than a first preset threshold; or determine the target luminance of the at least one of the main display screen or the at least one flexible display screen in response to a detection that the luminance of the ambient light is less than a second preset threshold.

15. The non-transitory computer readable medium of claim 13, wherein the pixel coordinate parameter of the photographed object on the photographing screen comprises at least one of a pixel of the photographed object on the photographing screen or pixel coordinates of the photographed object on the photographing screen.

16. The non-transitory computer readable medium of claim 13, wherein the instruction further enables the electronic device to determine the folding angle of the at least one flexible display screen based on an angle of view of the camera and the pixel coordinate parameter of the photographed object on the photographing screen.

17. The non-transitory computer readable medium of claim 13, wherein the instruction further enables the electronic device to determine, based on luminance of the photographing screen, the luminance of the at least one of the main display screen or the at least one flexible display screen.

* * * * *